United States Patent [19]

Chen

[11] 3,865,410
[45] Feb. 11, 1975

[54] COMPRESSION JOINT OR COUPLING FOR PIPES
[75] Inventor: Keith A. Chen, Milwaukee, Wis.
[73] Assignee: Norton-McMurray Manufacturing Company, Geneva, Ill.
[22] Filed: Sept. 29, 1972
[21] Appl. No.: 293,340

[52] U.S. Cl.................. 285/31, 285/249, 285/337, 285/348, 285/369
[51] Int. Cl............................................. F16l 21/00
[58] Field of Search .......... 285/337, 348, 249, 248, 285/331, 354, 369, 371, 31

[56] References Cited
UNITED STATES PATENTS
| 1,980,389 | 11/1934 | Dennie | 285/246 |
| 2,192,565 | 3/1940 | Szekely | 285/348 |
| 2,230,115 | 1/1941 | Kreidel | 285/248 |
| 3,078,332 | 2/1963 | Marx | 285/369 X |
| 3,603,912 | 9/1971 | Kelly | 285/249 |
| 3,647,934 | 3/1972 | Hurtt | 285/348 |
| 3,679,239 | 7/1972 | Schmitt | 285/249 |

FOREIGN PATENTS OR APPLICATIONS
| 723,052 | 12/1965 | Australia | 285/249 |
| 882,115 | 11/1961 | Great Britain | 285/249 |
| 1,095,068 | 12/1960 | Germany | 285/249 |

Primary Examiner—Dave W. Arola
Attorney, Agent, or Firm—Merriam, Marshall, Shapiro & Klose

[57] ABSTRACT

Stiffener assembly for use with conventional compression couplings in joining two lengths of plastic pipe or plastic pipe to metal pipe comprising a tubular stiffener which is inserted into bore of pipe in frictional engagement with inner wall. An end of the stiffener is provided with a radial flange which cooperates with a tubular retainer located on pipe between flange and gasket seal. Friction between pipe wall and stiffener increases force necessary to pull pipe out of coupling, permitting strength of joint to exceed that of the pipe alone.

12 Claims, 5 Drawing Figures

PATENTED FEB 11 1975       3,865,410

COMPRESSION JOINT OR COUPLING FOR PIPES

This application relates to compression fittings or joints for pipes, and particularly for synthetic plastic pipes. More particularly, the invention relates to a tubular stiffener and retainer for use in a compression coupling or joint for plastic pipe to make the joint stronger than the pipe itself, including its resistance to longitudinal pull-out.

One of the serious problems involved in making joints or couplings for joining together synthetic plastic pipes by mechanical means, as opposed to heat fusion or solvent cementing, is that of insuring that the joint is at least as strong as the pipe itself, particularly with respect to failure of the joint due to a longitudinal tensile stress which tends to pull the pipe out of the joint. Compression-type joints for plastic pipe are particularly prone to fail in this way, because of the relatively low coefficient of friction possessed by most of the plastic materials used for making pipe. This tends to cause the joint to fail by longitudinal slippage of the components of the joint. This failing becomes increasingly severe as the pipe size increases, and as a consequence mechanical joints or couplings for synthetic plastic pipe have not been practical in the larger sizes above about 1¼ inches in nominal diameter.

In addition to strength, a desirable or important attribute in a coupling for plastic pipe is the ability to fit and slide over the pipe itself in order to facilitate the joining of rigid pipe sections held in fixed relationship to each other, such as occurs when a defective section of a buried pipe is to be replaced. By having this longitudinal sliding ability, the coupling eliminates any necessity that the replacement section must fit precisely between the existing pipe ends. It also avoids the difficult procedure of inserting the ends of the pipe into the last joining fitting. Those couplings heretofore available having adequate strength against pull-out did not possess this "slide" characteristic, in addition to being limited in maximum size.

The present invention provides a stiffener and retainer for compression type joints which overcome the deficiencies of the prior art. By using the invention, it is now possible to make strong yet simple couplings for synthetic plastic pipes in sizes up to 4-inch diameter or more, while maintaining the desirable ability to slide over the pipe for maximum convenience during installation.

It should be understood that as used herein and in the appended claims, the term "joint" refers to a direct connection between two pipes or tubular members, while the term "coupling" refers to an auxiliary tubular member used to attach two or more pipes to one another by bridging gaps among the pipes. Accordingly, as used herein, a "coupling" includes two or more "joints," one at each end where it is connected to a pipe.

The joint of the invention employs in part a known type of compression connection between two tubular members or pipes, one having a larger diameter than the other, permitting the ends of the pipes or tubular members to telescope, one within the other. The larger pipe (or tubular member) is provided at its end with a confined or restricted annular cavity which may have, for example, a tapered, rectangular, or other suitable cross-section, including an annular surface against or into which an elastomeric or resilient gasket encircling the smaller pipe is compressed, deformed or urged by means of suitable mechanical means, such as a tubular nut which engages threads on the end of the larger pipe. The gasket is urged into sealing relationship against the outer surface of the smaller pipe and the annular surface in the end of the larger pipe, by turning the annular nut to compress the gasket. When the smaller pipe is made of a synthetic plastic material suitable for such use, such as polyethylene (PE), acrylonitrile-butadiene-styrene (ABS) cellulose acetate butyrate (CAB), polyvinyl chloride (PVC), chlorinated polyvinyl chloride (CPVC), and the like, all of which have low coefficients of friction, it is difficult or impossible to secure adequate resistance to longitudinal stress in the joint solely by means of the frictional engagement which the relatively narrow sealing gasket makes with the outer wall of the smaller pipe in the typical compression joint of the prior art.

The present invention retains the advantages of the conventional compression joint including its simplicity and low cost, while greatly increasing the strength of such joints, particularly against longitudinal tensile stress, to the extent that joints using the invention, even in the larger sizes, have a strength at least equal to that of the pipe itself.

Briefly described, the invention adds to the conventional compression joint heretofore known, a tubular stiffener positioned within the bore of the smaller pipe and in frictional engagement with the inner wall thereof, the end of the stiffener having a radial flange which extends beyond the pipe wall, and a tubular retainer overlying the smaller pipe between the sealing gasket and the flange of the stiffener. The stiffener should be sufficiently long that it extends under the gasket positioned on the outer wall of the pipe. The invention increases the tensile strength of the joint by making use of the added friction between the stiffener and the inner pipe wall to resist pull-out of the pipe.

The invention will be better understood from the following detailed description thereof, taken in conjunction with the accompanying drawings, in which like numerals are used to indicate the same or similar parts, and in which.

Figure 1:
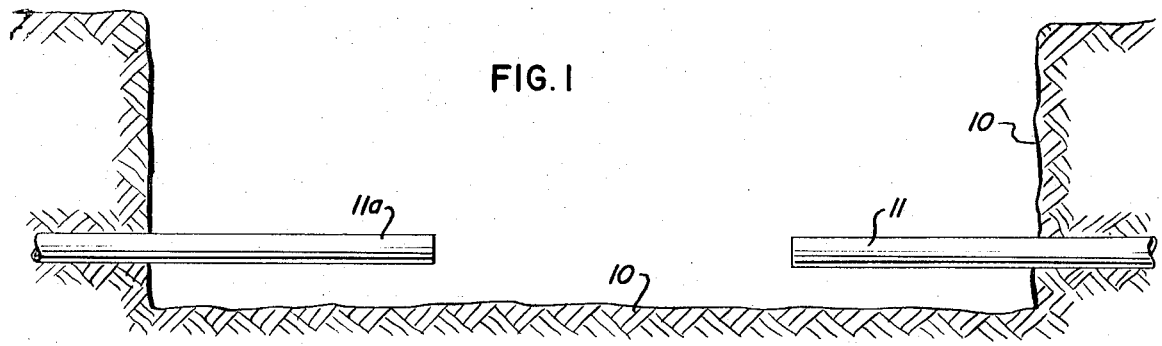
FIG. 1 represents a typical use for joints made in accordance with the invention, and shows a trench uncovering a section of buried plastic pipe in which a defective section has been removed.

Referring to the figures, FIG. 1 shows a trench 10 which has been dug to uncover a buried pipe from which a defective section has been removed, leaving a gap between the exposed ends 11, 11a of the buried pipe.

Figure 2:
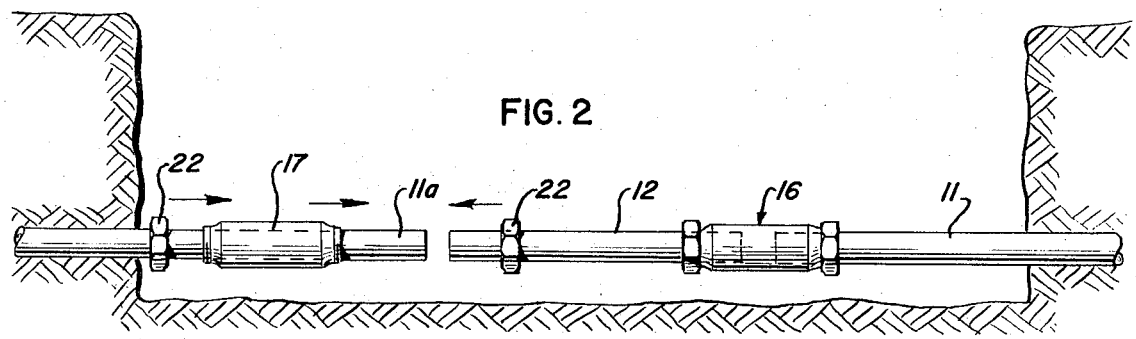
FIG. 2 shows the use of two couplings of the invention to add a spool piece to replace the defective section which has been removed, and illustrates the ability of the coupling to slide over the pipe.
Figure 3:
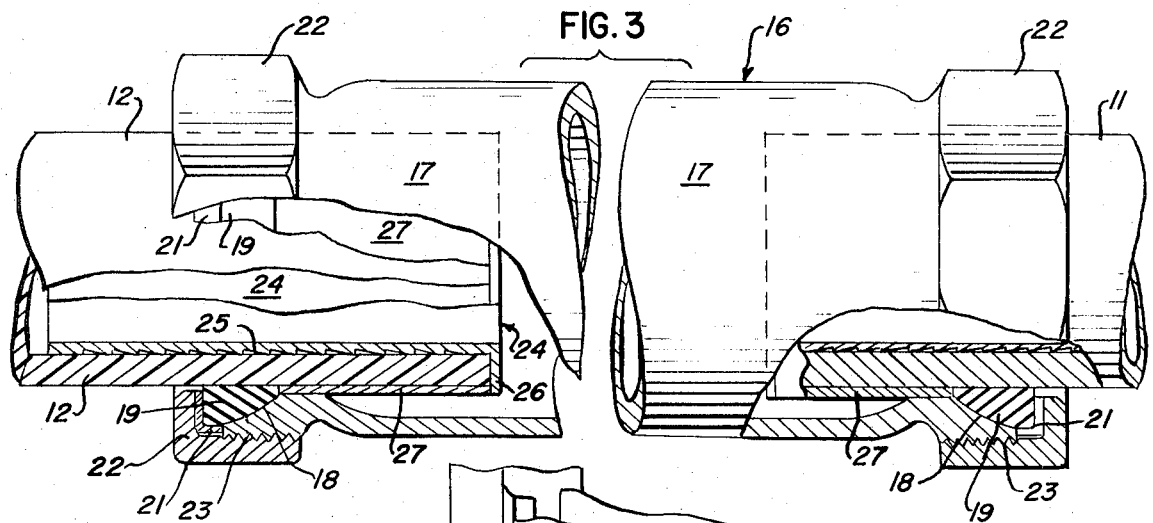
FIG. 3 is an enlarged detail in partial section of a coupling in accordance with the invention.

In FIG. 2, a spool piece 12 has been connected by coupling 16 to pipe end 11 at the right, while at the left the drawing shows a disassembled coupling including tubular sleeve 17 and tubular nuts 22 being positioned to complete the connection to pipe end 11a. Because the coupling can be slid over the pipe to span the gap to be covered, it will be seen there is substantial leeway in the length of the spool piece 12 which can be used in making the connection. The spool piece 12 need not be of a length which provides a precise fit, and accordingly the ease of making such an installation in the field is greatly enhanced. corresponds FIG. 3 shows an enlarged detail in partial section of the joint made by coupling assembly 16 between pipe 11 at one end and spool piece 12 at the other end. As shown, coupling assembly 16 comprises a tubular sleeve 17 having an inner diameter larger than that of the associated pipe (i.e., 11 or 12) with which it is used, permitting the coupling to telescope over the ends of the pipes to be joined. As shown in FIG. 3, each end of tubular sleeve 17 is provided with a tapering annular surface 18 designed to accept sealing gasket 19 which encircles the pipe, e.g., 12, and is adapted to form a seal between surface 18 and the outer wall of pipe 12. The base of gasket 19 is provided with a cup-shaped gasket retainer 21 which contacts the base of internally threaded tubular nut 22. The threads 23 of nut 22 engage similar external threads on the end of sleeve 17 adjacent tapered annular surface 18. Gasket 19 is urged into fluid-tight sealing relationship with respect to pipe 12 and tubular sleeve 17 by suitably rotating tubular nut 22, thereby compressing or deforming gasket 19 against the annular surface 18 and the outer wall of pipe 12.

The construction thus far described generally corresponds to that of a conventional compression fitting well known in the art. The novel aspect of the invention comprises a tubular stiffener 24 sized to fit within the interior of pipe 12 and in frictional contact with the inner wall of the pipe. The end of stiffener 24 is provided with a radially directed flange 26 having an outer diameter larger than the outer diameter of the pipe 12 in which it is used, but less than the inner diameter of coupling 17, permitting the end of pipe 12 with stiffener 24 installed therein to telescope into coupling 17. The outer surface 25 of stiffener 24 preferably has an undulating configuration which increases its frictional contact with the interior of the pipe, such as by the use of barbs, teeth, threads, serrations or knurls, as may be appropriate for the particular material and the wall thickness of the pipe which is used. Stiffener 24 preferably has a length such that when flange 26 abuts the end of pipe 12, it extends under gasket 19 on the outer surface of the pipe, so that when the gasket is tightened, the pipe wall is compressed or urged onto the stiffener, thereby increasing the friction between the pipe and stiffener. In order to resist this compressive force and to prevent crushing, the stiffener should be made of a suitably rigid material, preferably metal such as steel.

Positioned on the end of pipe 12 between gasket 19 and flange 26 is a tubular retainer 27 in the form of a thin walled hollow cylinder having an internal diameter slightly larger than the outer diameter of the pipe, thereby permitting the retainer to be easily slipped over the pipe, and an outer diameter small enough to permit insertion of the retainer into the bore of coupling 17. In addition, the inner diameter of retainer 27 must be smaller than the outer diameter of flange 26, whereby the retainer abuts the flange and is restrained by it. Retainer 27 is suitably formed of metal or other relatively rigid material which will resist buckling in the presence of a compressive longitudinal forces exerted on its ends.

When a joint is assembled as shown in FIG. 3, with retainer 27 abutting a flange 26 at one end and gasket 19 at the other end, stiffener 24 is fixed relative to stress tending to withdraw it from coupling 17. Accordingly, a tensile stress applied to pipe 12 tending to pull it out of the coupling would have to overcome not only the friction provided by gasket 19 against the outer wall of pipe 12, as in a conventional compression fitting, but also the friction developed between the inner wall of pipe 12 and stiffener 24. The resistance to pull-out of the pipe is thereby greatly increased, so that the tensile strength of the pipe itself is exceeded before the pipe can be pulled out of the coupling.

It will be obvious to those skilled in the art that the stiffener and the retainer assembly which is depicted in FIG. 3 in two parts can be made if desired as a single unit, with the retainer integrally connected to the rim of the flange 26. It is generally more convenient, however, and it is therefore preferred, to make and use the parts individually as shown.

Figure 5:
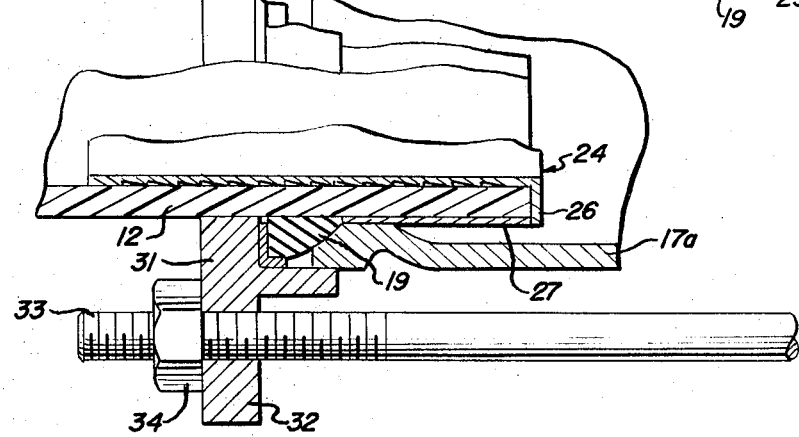
FIG. 5 is an enlarged detail in partial section of alternative means for forming the compression seal in accordance with the invention.
Figure 4:
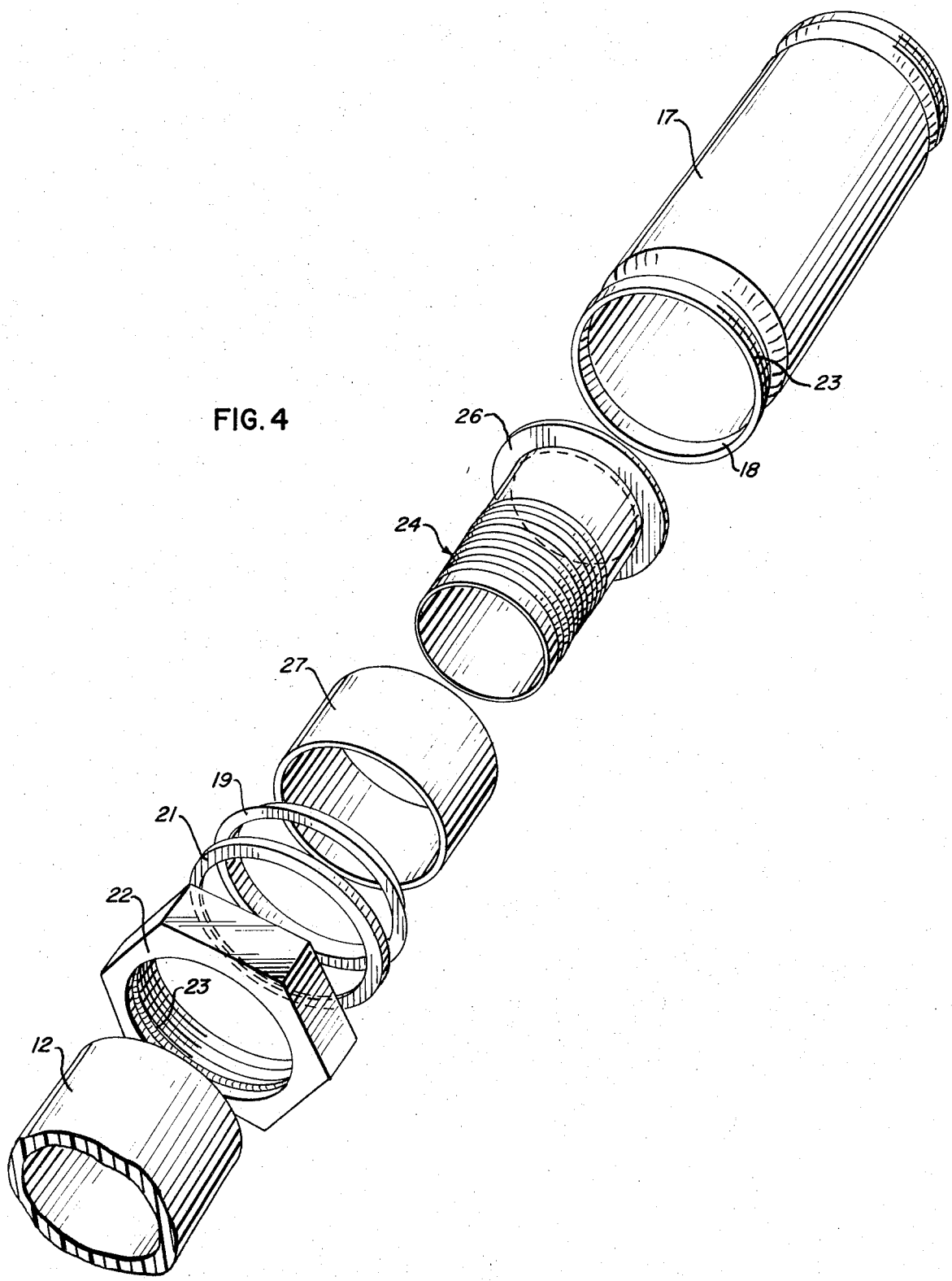
FIG. 4 is an exploded isometric view of the individual components which are used in making the joint in one end of the coupling of FIG. 3.

In FIG. 5, there is shown an alternative embodiment of the means whereby the seal between the pipe and the coupling can be effected. In this embodiment, tubular sleeve 17a is identical to sleeve 17 shown in FIG. 3, except for the absence of the threads adjacent its end. The means for urging gasket 19 into sealing relationship between the end of sleeve 17a and the wall of pipe 12 is in this case a cup-shaped seal plate 31 provided with a bore through which pipe 12 passes and with an annular flange 32, around the periphery of which are positioned a plurality of bolts 33 and mating nuts 34. The other end of coupling 17a (not shown) is provided with a similar seal plate to which the other ends of bolts 33 are connected in a similar manner. Except for the means for compressing the gasket in the embodiment of FIG. 5, the operation of the joint corresponding exactly with that described in connection with FIG. 3.

Since a longitudinal tensile stress applied to pipe 12 is transferred via retainer 27 to the edge of gasket 19 in contact therewith, it is preferred that this edge of the gasket be "armored," i.e., have a suitable metallic reinforcement to prevent the retainer from cutting into the gasket and destroying its sealing effectiveness. If the gasket is plain, without reinforcement, it is preferred to flare, upset, or bulge the end of retainer 27 which comes in contact with the gasket, to provide a suitable bearing surface.

Although the coupling which has been specifically described is intended for joining straight pieces of pipe, it will be obvious that the invention is not restricted thereto. The same type of joint which has been shown can be formed at the ends of couplings intended for making bends, such as elbows, or other connections, such as Y's and T's, without varying from the principles of the invention. In addition, the coupling can be used to connect two lengths of plastic pipe or connect plastic pipe to metal pipe.

The foregoing detailed description has been given for clearness of understanding only, and no unnecessary limitations should be understood therefrom, as modifications will be obvious to those skilled in the art.

I claim:

1. A compression-type coupling for joining two or more spaced-apart pipes and, lengths of pipe, each having an internal wall surface defined by the inside diameter of said pipe and having an external wall surface defined by the outside diameter of said pipe, at least one of said lengths of pipe being formed of plastic material, said coupling comprising a tubular coupling member having an inner diameter surrounding lengths of pipe positioned within said coupling in telescoping relationship therewith, each end of said tubular coupling member having gasket sealing means cooperating with reinforcing and sealing attachments on an end of each telescoping pipe, to provide a fluid-tight connection comprising, an annular gasket engaging surface on each end of said coupling, a deformable sealing gasket positioned on the telescoping portion of joined pipe and frictionally engageing said pipe and providing a fluid-tight seal between said gasket engaging surface of the coupling and a portion of the external wall surface of the telescoping portion of associated pipe, a tubular retainer overlying the telescoping portion of associated pipe, and being sufficiently large to be slipped axially over the outer diameter of the pipe, and said retainer having an abutting portion for longitudinal force-transferring abutting engagement with the sealing gasket as an axially directed force tends to pull and separate pipe from the tubular coupling member, a tubular stiffener partially inserted within an associated pipe to frictionally engage the internal wall surface of the pipe and sandwich the encapsulated pipe between the tubular stiffener and the tubular retainer in a reinforcing relationship increasing the strength of that pipe above that of the plastic pipe alone, said stiffener being provided at one end with an outwardly extending flange having an outer diameter larger than the outer diameter of the operatively associated pipe but smaller than the inner diameter of the associated end of said tubular coupling member, thus permitting the tubular coupling member to be completely and freely slipped over at least one of the reinforced pipes to facilitate joining closely spaced lengths of pipe, and adjustable means urging said gasket into sealing relationship between said gasket engaging surface of the tubular coupling member and a portion of the external wall surface of associated pipe, said gasket being positioned radially outwardly of a portion of the tubular stiffener and urging the associated underlying pipe into frictional engagement with the tubular stiffener.

2. The coupling of claim 1 wherein said adjustable means urging said gasket into said sealing relationship comprises a seal plate positioned contiguous with each end of said tubular coupling member to engage said gasket, the seal plates being urged axially toward each other by a plurality of axial bolt-like fasteners.

3. The coupling of claim 1 wherein said tubular stiffeners have sufficient axial length providing a portion of each stiffener underlying the associated gasket when lengths of pipe are telescoped into said tubular coupling member in fluid-tight sealing relationship and provide an axially extending, reinforced gasket sealing section on lengths of the associated telescoping pipe.

4. The coupling of claim 1 wherein an outer surface of the tubular stiffeners has undulations which provide frictional engagement between the stiffeners and each associated pipe.

5. The coupling of claim 1 wherein said sealing gasket and tubular retainer are constructed and arranged in axial alignment and provide a force-transferring connection between the tubular coupling member and pipe being joined and utilize frictional engagement between the gasket and associated pipe and frictional engagement between the tubular stiffener and associated pipe to prevent axial separation of the tubular coupling member and associated pipe.

6. In combination, a compression-type joint between a first tubular member and a plastic second tubular pipe member of smaller diameter, an end of said plastic second tubular pipe member being selectively telescoped to a variable depth within a larger diameter end of said first tubular member, a deformable annular gasket being urged, by tightening means, between said larger end of said first tubular member and an outer wall surface of said second tubular member and providing frictional sealing engagement and deforming a section of the underlying associated plastic pipe member radially inwardly, a tubular stiffener having an insert portion extending into said end of said second tubular member for reinforcing and for frictionally and securely engaging a radially inwardly deformed inner wall surface of said second tubular member and for securing the end of the second tubular member, to allow the strength of the reinforced end of the second tubular member to exceed that of said second tubular member alone, said stiffener having, at one end, an outwardly extending flange with an outer diameter larger than the outer diameter of said second tubular member but smaller than the larger diameter end of said first tubular member, thus permitting the first tubular member to be telescoped to a variable degree onto the reinforced second tubular member, a tubular retainer being telescoped into said first tubular member and overlying said second tubular member between the outwardly extending flange of said stiffener and said gasket, the inner diameter of said retainer being smaller than the outer diameter of said flange, so that said retainer is axially aligned with a portion of said flange and sufficiently large to be freely slipped axially over the second tubular member prior to placement of the tubular stiffener into the end of the second tubular member, said first tubular member providing an axially continuous chamber extending therethrough and permitting the smaller diameter plastic second tubular pipe member to be fully telescoped therethrough, said tubular stiffener having an axial length greater than the axial length of the tubular retainer and providing an axially extending reinforced sealing section on said second tubular member receiving the deformable gasket so that the telescoped first and second tubular members may be securely and axially joined, as desired, along a length of said sealing section.

7. The combination of claim 6 in which said retainer and said stiffener are integrally connected along the periphery of said flange.

8. The combination of claim 6 in which the outer surface of said stiffener has undulations which provide frictional engagement between said stiffener and the radially inwardly deformed section of said second tubular member.

9. The combination of claim 6 wherein said sealing gasket and tubular retainer are constructed and arranged in axial alignment to provide a force-transferring connection between the first tubular member and the second tubular plastic pipe member to utilize frictional engagement between the gasket and the second tubular member and frictional engagement between the tubular stiffener and the second tubular member to prevent axial separation of the first tubular member from the associated second tubular member.

10. A compression-type coupling interconnecting separate lengths of spaced-apart tubular member having end sections telescoped into each end of the coupling, the improvement comprising,
   a coupling housing having a central body section intermediate, and connected to, end portions which define end openings,
   said end portions including a connecting portion and a gasket engaging portion,
   a deformable sealing gasket forming a fluid-tight seal and having an inner sealing surface frictionally engaging and disposed about an outer periphery of an operatively associated telescoping tubular end section of the tubular member and also having a contacting portion operatively associated with said gasket engaging portion of the coupling housing, and said contacting portion extending circumferentially contiguous to said gasket, and said contacting portion abutting at least a portion of said sealing gasket,
   a tube stiffener having a cylindrical body portion for frictionally engaging and reinforcing the inside of the operatively associated telescoping tubular end section, said stiffener having an axial length defined by an inside end portion disposed within each tube and an outside end portion axially spaced from said inside end portion and being outside the telescoping tubular end section, and further, said outside end portion including a radially extending flange having an outer diameter greater than the outer diameter of the telescoping tubular end section,
   an annular tubular retainer having an axial length less than the axial length of said tube stiffener and having an inside diameter which is less than the outer diameter of said radially extending flange of the tube stiffener but being sufficiently large to be freely slipped axially over the outer diameter of the associated tubular member prior to insertion of said tubular stiffener, said tubular retainer being disposed about its operatively associated telescoping tubular end section between said radially extending flange and the sealing gasket,
   said radial flange of the tube stiffener and said tubular retainer having outer diameters which are less than the diameter of the associated end opening of the coupling housing to provide for insertion and withdrawal of the tubular end section and associated tube stiffener and tubular retainer into and from the coupling housing, and further, said coupling housing having a diameter sufficiently large and permitting the coupling housing to be telescoped completely onto at least one of said reinforced tubular members to facilitate coupling,
   tightening means having an attaching section receiving the connecting portion of the coupling end portion and having a wall portion abutting said sealing gasket and selectively urging the contacting portion of the gasket into sealing relationship with the gasket engaging portion of the housing end portion, and deforming the associated underlying tubular member into frictional contact with the tubular stiffener,
   said sealing gasket and said tubular retainer providing axial engagement to transfer tensile forces between said coupling housing and the tube stiffener and preventing axial separation of the coupling from a secured end section of a tubular member, and
   said secured tubular end section of each tubular member being stronger than the tubular member itself, and having pull-out resistance greater than the tensile strength of the associated tubular member.

11. The coupling of claim 10 wherein the tubular retainer includes a first end portion constructed in abutting relationship with the radially extending flange of the tube stiffener and also includes a second end portion axially spaced from the first end portion and positioned for abutting relationship with the sealing gasket, and
   the cylindrical body portion of the tube stiffener has an axial length greater than the axial length of the operatively associated tubular retainer, to reinforce the associated tubular member and to provide an axially extending, gasket sealing section on the surface of each tubular member.

12. The coupling of claim 11 wherein the end portions of the coupling housing are spaced apart a length substantially corresponding to the axial distance between gasket sealing sections of the tubular members to be secured together.

* * * * *

UNITED STATES PATENT OFFICE
CERTIFICATE OF CORRECTION

PATENT NO. : 3,865,410
DATED : February 11, 1975
INVENTOR(S) : Keith A. Chen

It is certified that error appears in the above-identified patent and that said Letters Patent are hereby corrected as shown below:

Column 3, line 9, delete "corresponds"; column 4, line 6, delete "a", line 41, change "corresponding" to --corresponds--; column 5, line 2, after "pipes" insert --,--, after "pipe" delete ","; column 7, line 20, change "member" to --members--.

Signed and sealed this 15th day of July 1975.

(SEAL)
Attest:

RUTH C. MASON
Attesting Officer

C. MARSHALL DANN
Commissioner of Patents
and Trademarks